J. G. WHITE.
VARIABLE SPEED TRANSMISSION MECHANISM.
APPLICATION FILED MAY 22, 1912.
1,050,888.
Patented Jan. 21, 1913.
2 SHEETS—SHEET 1.
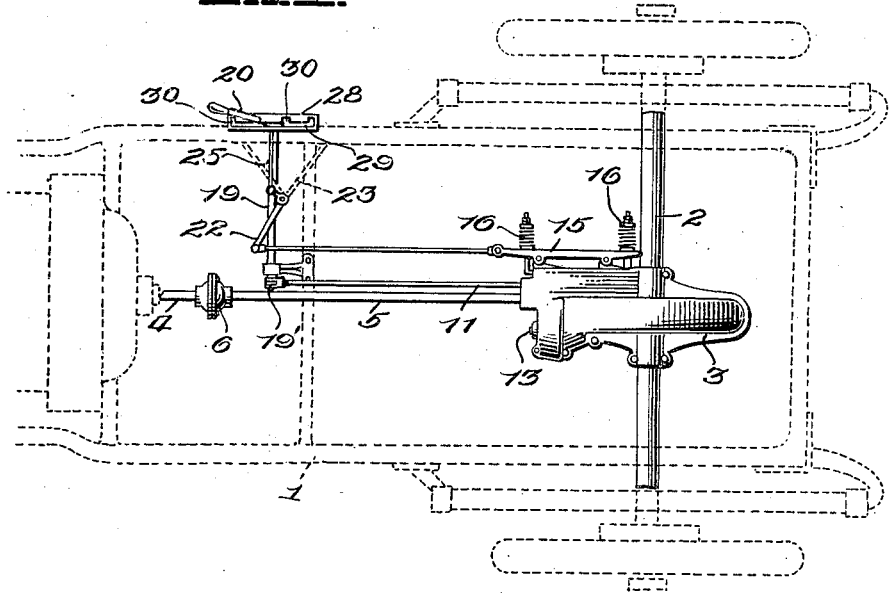
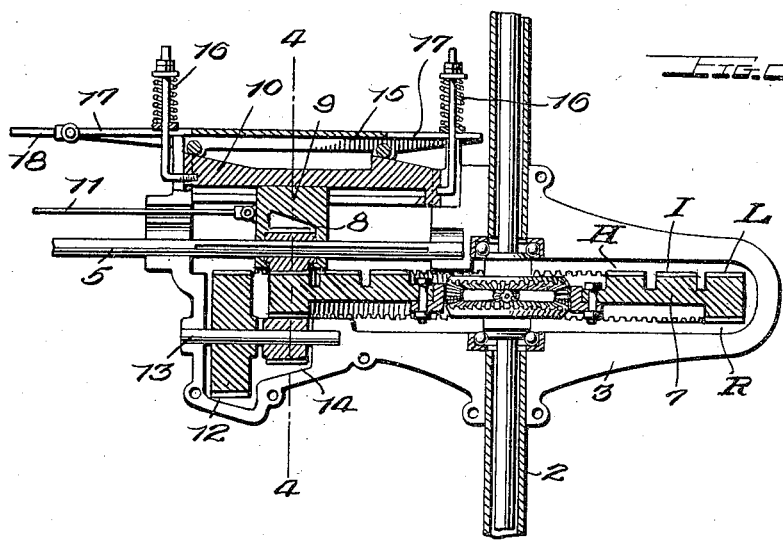
Witnesses
Chas. L. Griesbauer.
A. B. Norton.
Inventor
John G. White,
By Watson E. Coleman,
Attorney

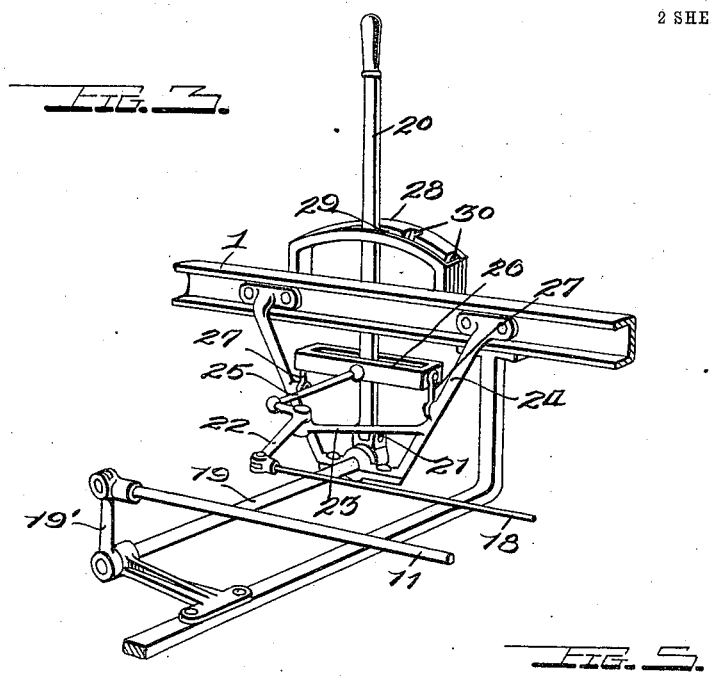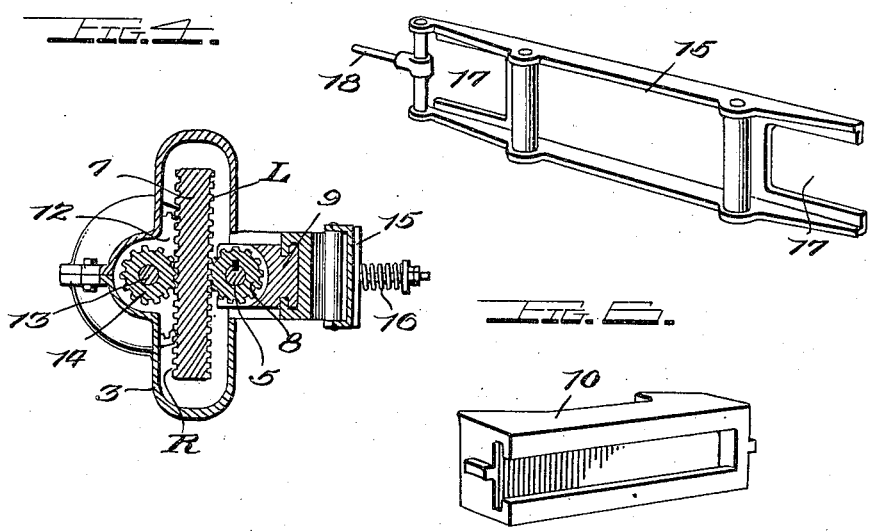

UNITED STATES PATENT OFFICE.

JOHN G. WHITE, OF NEWBERRY, FLORIDA.

VARIABLE-SPEED-TRANSMISSION MECHANISM.

1,050,888.   Specification of Letters Patent.   Patented Jan. 21, 1913.

Application filed May 22, 1912. Serial No. 699,030.

*To all whom it may concern:*

Be it known that I, JOHN G. WHITE, a citizen of the United States, residing at Newberry, in the county of Alachua and State of Florida, have invented certain new and useful Improvements in Variable-Speed-Transmission Mechanism, of which the following is a specification, reference being had to the accompanying drawings.

This invention comprehends certain new and useful improvements in variable speed transmission mechanism for automobiles, motor trucks, and similar self-propelled vehicles, and the invention has for its primary object an improved construction of mechanism of this character which will be composed of comparatively few and simple parts, that will not be liable to become worn, that will be durable and efficient in operation, not liable to get out of order, and capable of being readily assembled. And the invention also aims to generally improve mechanism of this class and to render it more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings, in which, Figure 1 is a plan view of a motor vehicle equipped with the improvements of my invention. Fig. 2 is a sectional view through the transmission mechanism, the top of the casing being removed. Fig. 3 is a perspective view of one form or embodiment of actuating mechanism which may be employed. Fig. 4 is a detail sectional view, the section being taken on the line 4—4, of Fig. 2. Fig. 5 is a detail view of one of the wedge bars hereinafter specifically referred to, and, Fig. 6 is a detail perspective view of the other wedge bar.

Corresponding and like parts are referred to in the following description and designated in the accompanying drawings by like reference characters.

Referring to the drawings, the numeral 1 designates the frame-work or chassis of an automobile or similar self-propelled vehicle, 2 the rear axle with its differential casing 3, 4 the motor drive shaft and 5 the transmission drive shaft which is connected to the motor drive shaft by a universal joint, as indicated at 6.

Mounted in the differential casing 3, is a master gear wheel 7 which, in the present instance, is formed on one face with three annular sets of gear teeth designated L, I and H, respectively, indicating low speed, intermediate speed and high speed. These sets of teeth are, respectively, designed for engagement by a driving pinion 8 which is splined on the drive shaft 5 which extends parallel to the plane of the master gear 7. The driving pinion 8 is journaled in a carrier 9 which is held by tongue and groove connection for sliding engagement on a wedge bar 10 and which is movable forwardly and rearwardly by means of a link rod 11, whereby the said pinion may be caused to engage with any of the teeth L, I and H. The driving pinion 8 is also designed for engagement with a relatively large pinion 12 which is mounted on a shaft 13 within the differential casing 3, a pinion 14 being also mounted on the shaft 13 and meshing with an annular set of gear teeth designated R formed on the master gear 7.

In order to move the pinion 8 laterally to disengage it from one set of gear teeth, preparatory to shifting it longitudinally for subsequent engagement with another set of gear teeth, the wedge bar 10 is engaged by a complemental wedge bar 15 which is mounted for a longitudinal movement, whereby when it is moved forwardly, it will move the wedge bar 10 inwardly or laterally, and whereby when the wedge bar 15 is moved rearwardly, the wedge bar 10 may be permitted to move outwardly in a lateral direction through the instrumentality of its spring-encircled rods 16 which support it and which are received in longitudinally elongated slots 17 formed in the wedge bar 15. In order to move the wedge bar 15 forwardly and rearwardly, a link rod 18 is secured to it at its forward end.

The actuating means in the present embodiment of my invention includes a transversely extending shaft 19 (see Fig. 3), said shaft being suitably journaled in bearings supported by the main frame-work of the vehicle and being provided with a crank 19' which is pivotally connected to the link rod 11. Mounted upon the transversely extending actuating shaft 19, is a single shipper lever 20, which is so connected to the shaft that a forward and rearward movement of the lever will partially rotate said shaft, the said lever being pivotally connected at its lower end to said shaft, as indicated at 21, whereby the lever may be shifted laterally without imparting any turning movement to the shaft. The link rod 18 which is connected to the wedge bar 15, is pivotally connected at its forward end to one arm of a bell crank lever 22, said lever being fulcrumed at its elbow on arms 23 of a bracket or supporting frame 24 which is secured to one of the side bars of the frame-work and which supports the shaft 19 at one end, as clearly illustrated in Fig. 3. The other arm of the bell crank 22 is connected by a rod 25 to a longitudinally slotted yoke bar 26 pivotally connected by rods 27 to the side arms of the frame 24, the shipper lever 20 being accommodated in the slot of said yoke, whereby it may move freely in a forward and rearward direction therein, without imparting any motion to the yoke, but when moved laterally, will also move the yoke laterally and thereby swing the bell crank 22 to impart a forward or rearward movement to the link rod 18 and the wedge bar 15, which is connected to the latter. The shipper lever 20 extends upwardly through a sector 28 which is formed with a longitudinally extending slot 29 intersected at intervals by laterally disposed recesses 30.

From the foregoing description in connection with the accompanying drawings, the operation of my improved variable speed transmission mechanism will be apparent. In the practical use of the apparatus, any movement of the shipper lever 20 to the left so as to disengage it from one of the side recesses 30 of the sector 28, will manifestly rock the bell crank lever 22 in a direction to push the wedge bar 15 rearwardly so as to permit the spring-encircled bolts 16 of the wedge bar 10 to draw the latter outwardly in a lateral direction and thus move the driving pinion 8 to a relatively neutral position, whereupon the shipper lever 20 may be moved forwardly or rearwardly so as to shift the carrier 9 and the said driving pinion from one of the sets of gear teeth L, I or H, to another or to the pinion 12. Thus, it will be seen that by a very simple movement of a single lever, the different speeds may be secured.

It is to be understood that my invention is not limited to any number of annular sets of gear teeth on the master gear 7, nor to any proportions of the parts, as various changes may be made in the construction, arrangement and proportions of the parts without departing from the principles and scope of my invention, as defined in the appended claims.

What I claim is:—

1. Variable speed transmission mechanism, including a master gear wheel provided with a plural number of sets of gear teeth, a drive shaft, a driving pinion splined on said drive shaft, a carrier in which said pinion is journaled, a wedge bar with relation to which said carrier has a longitudinally sliding movement, a wedge bar complemental to the first named wedge bar and engaging the same, means tending to move the first named wedge bar outwardly in a lateral direction, for the purpose specified, and means for moving the second named wedge bar longitudinally and for shifting the carrier longitudinally.

2. Variable speed transmission mechanism, including a master gear wheel provided with a plural number of sets of gear teeth, a drive shaft, a driving pinion splined on said drive shaft, a carrier in which said pinion is journaled, a wedge bar with relation to which said carrier has a longitudinally sliding movement, a wedge bar complemental to the first named wedge bar and engaging the same, means tending to move the first named wedge bar outwardly in a lateral direction, for the purpose specified, and means for moving the second named wedge bar longitudinally and for shifting the carrier longitudinally, said means including link rods connected to the second named wedge bar and carrier, respectively, a shipper lever and operative connections between said shipper lever and said link rods, whereby a forward and backward movement of said shipper lever will move the carrier longitudinally and a lateral movement of the shipper lever will move the second named wedge bar longitudinally.

3. Variable speed transmission mechanism, including a master gear wheel provided with a plural number of sets of annular gear teeth, a driving pinion, a carrier in which said pinion is journaled, a wedge bar with relation to which said carrier has a longitudinally sliding connection, a link rod connected to said carrier, another wedge bar engaging the first named wedge bar, a link rod connected to said second named wedge bar, a transversely extending actuating shaft provided with a crank to which the first named link rod is pivotally connected, a bell crank pivotally connected to the second named link rod, a support for said bell crank, a shipper lever operatively connected to said shaft and movable laterally relative thereto, a laterally swinging longitudinally slotted yoke accommodating said lever, and a connection between said yoke and said bell crank.

4. Variable speed transmission mechanism, including a master gear wheel provided with a plural number of sets of annular gear teeth, a driving pinion, a carrier in which said pinion is journaled, a wedge bar with relation to which said carrier has a longitudinally sliding connection, a link rod connected to said carrier, another wedge bar engaging the first named wedge bar, a link rod connected to said second named wedge bar, a transversely extending actuating shaft provided with a crank to which the first named link rod is pivotally connected, a bell crank pivotally connected to the second named link rod, a support for said bell crank, a shipper lever operatively connected to said shaft and movable laterally relative thereto, a laterally swinging longitudinally slotted yoke accommodating said lever, a connection between said yoke and said bell crank, and a sector formed with a longitudinally extending slot receiving said lever and a plurality of laterally disposed recesses intersecting said slot, for the purpose specified.

In testimony whereof I hereunto affix my signature in the presence of two witnesses.

JOHN G. WHITE.

Witnesses:
GEO. S. LIVINGSTON,
FREDERICK S. STITT.

Copies of this patent may be obtained for five cents each, by addressing the "Commissioner of Patents, Washington, D. C."